US012347440B2

(12) United States Patent
Yan et al.

(10) Patent No.: US 12,347,440 B2
(45) Date of Patent: Jul. 1, 2025

(54) SPEAKER VERIFICATION SYSTEM USING ULTRASOUND ENERGY IN HUMAN SPEECH

(71) Applicant: Board of Trustees of Michigan State University, East Lansing, MI (US)

(72) Inventors: Qiben Yan, Okemos, MI (US); Hanqing Guo, Okemos, MI (US); Li Xiao, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 274 days.

(21) Appl. No.: 18/311,412

(22) Filed: May 3, 2023

(65) Prior Publication Data

US 2023/0360653 A1    Nov. 9, 2023

Related U.S. Application Data

(60) Provisional application No. 63/338,159, filed on May 4, 2022.

(51) Int. Cl.
*G10L 17/18* (2013.01)
*G10L 17/26* (2013.01)

(52) U.S. Cl.
CPC ............... *G10L 17/18* (2013.01); *G10L 17/26* (2013.01)

(58) Field of Classification Search
CPC .................................. G10L 17/18; G10L 17/26
USPC ............................................................ 704/200
See application file for complete search history.

(56) References Cited

U.S. PATENT DOCUMENTS

| | | | |
|---|---|---|---|
| 9,633,269 B2 * | 4/2017 | Gu | G06V 40/1376 |
| 11,392,833 B2 * | 7/2022 | Wieman | G06N 3/084 |
| 2019/0012446 A1 * | 1/2019 | Lesso | G10K 11/178 |
| 2020/0366671 A1 * | 11/2020 | Larson | G06F 9/451 |
| 2022/0157334 A1 * | 5/2022 | Alonso | G10L 15/22 |
| 2023/0360653 A1 * | 11/2023 | Yan | G10L 17/26 |

FOREIGN PATENT DOCUMENTS

| | | | | |
|---|---|---|---|---|
| CN | 114238849 A | * | 3/2022 | |
| CN | 118865986 A | * | 10/2024 | |
| KR | 20200032228 A | * | 3/2020 | |
| WO | WO-2023075751 A1 | * | 5/2023 | ............ G06F 21/32 |
| WO | WO-2023075753 A1 | * | 5/2023 | ............ G01S 15/003 |
| WO | WO-2023075754 A1 | * | 5/2023 | ............ G01S 15/003 |

* cited by examiner

*Primary Examiner* — Edwin S Leland, III
(74) *Attorney, Agent, or Firm* — Harness, Dickey & Pierce, PLC

(57) ABSTRACT

A speaker verification system includes an ultrasonic microphone generating electrical sound signal from an audio signal corresponding to both ultrasonic frequency sound and sub-ultrasonic frequency sound. A liveness detection module generates a high frequency energy distribution based on the electrical sound signal. The liveness module generates a verification result based on the high frequency energy distribution. A speaker verification module verifies the audio signal based on the high frequency energy distribution signals and a neural network architecture.

23 Claims, 4 Drawing Sheets

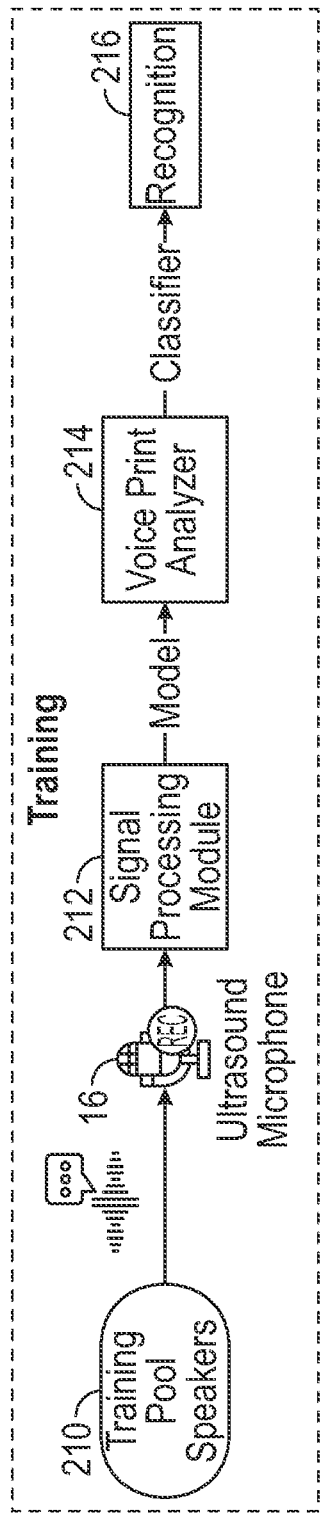
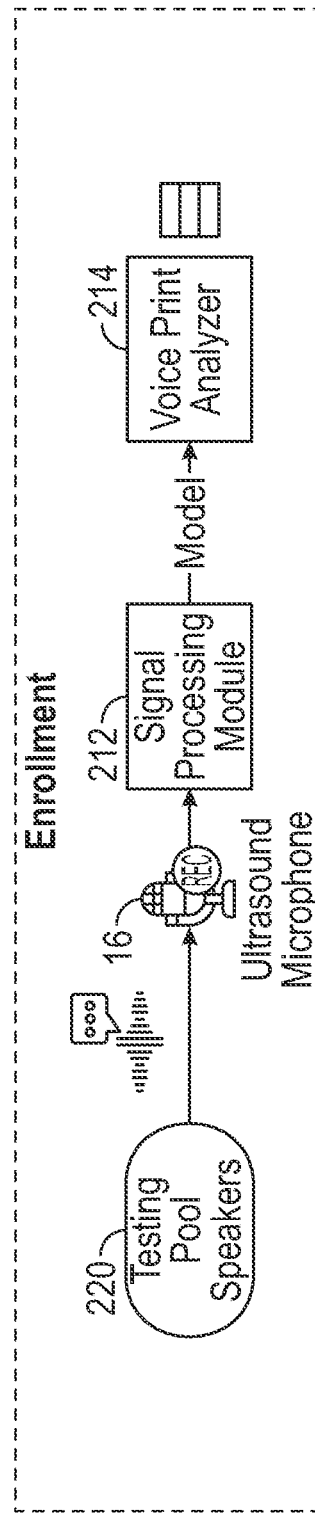
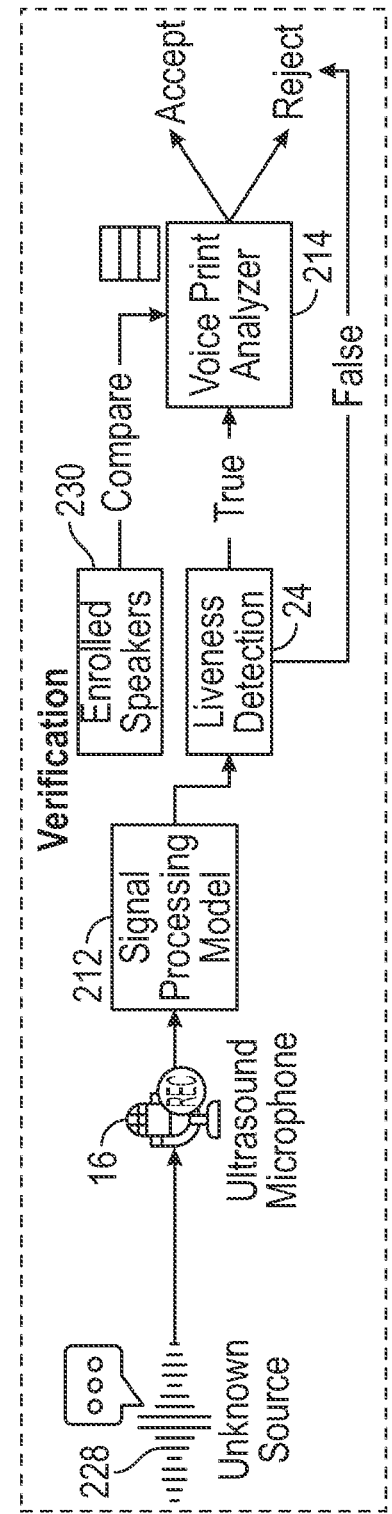
FIG. 2A
FIG. 2B
FIG. 2C

SPEAKER VERIFICATION SYSTEM USING ULTRASOUND ENERGY IN HUMAN SPEECH

STATEMENT REGARDING FEDERALLY SPONSORED RESEARCH OR DEVELOPMENT

This invention was made with government support under 1950171 awarded by the National Science Foundation. The government has certain rights in the invention.

RELATED APPLICATIONS

The present application is a non-provisional application of U.S. 63/338,159 filed on May 4, 2022, the disclosure of which is incorporated by reference herein.

FIELD

The present disclosure relates to a speaker verification system and, more particularly to a system for speaker recognition and verification.

BACKGROUND

This section provides background information related to the present disclosure which is not necessarily prior art.

Modern devices increasingly use biometric technologies for user authentication. Various types of human biometrics include fingerprint, facial, iris, and the like. Voice biometrics demonstrate great benefits in its high usability, convenience, and security. Speaker Verification (SV) systems commonly use voice biometrics to automatically accept or reject a voice input based on the speaker models stored on the smart devices or cloud. Nowadays, all the popular voice assistants such as Siri®, Alexa®, and Google Assistant® have integrated SV algorithms for certain wake words (e.g., "Hey, Siri", "Ok, Google"). A more appealing approach, called text-independent speaker verification, could accurately and efficiently verify arbitrary utterances from a target speaker based on a limited set of enrolled sentences. Recently, security researchers have demonstrated the susceptibility of SV systems to voice mimicry attacks and replay attacks, where the attackers imitate victims' voices or record/replay them to bypass the SV systems. As the number of sensitive applications (e.g., banking) of voice assistants is growing, practical SV systems aim to achieve not only high accuracy in text-independent speaker verification but also high efficacy in defending spoofing attacks under a limited time budget.

Recent SV studies have explored the distinctive vocal or non-vocal features such as phoneme position, cumulative spectrum, mouth motion, body vibration, and sound field. Based on these features, conventional machine learning models have been used to generate speaker models, including correlation (CORR), support vector machine (SVM), Gaussian mixture models (GMM), etc. Meanwhile, deep neural network (DNN) based SV systems use robust neural networks for building speaker models with the prototypical features (e.g., waveform, spectrogram, and MFCC (Mel-Frequency Cepstral Coefficients)). Most of the existing SV systems cannot simultaneously achieve effective speaker verification and defense against spoofing attacks, while others have limitations in their usability, e.g., with the requirement of wearing extra devices, staying at the same positions as the enrollment phase, etc. Moreover, their discovered vocal or non-vocal features cannot be transferred across different speaker models. Although existing DNN-based SV systems do not deal with rigid features, they tend to yield relatively high error rates due to the lack of speaker representative features.

Recent attacks towards voice assistants, such as DolphinAttack and SurfingAttack, leveraged the inaudible ultrasound signals to inject commands into voice assistants.

SUMMARY

This section provides a general summary of the disclosure and is not a comprehensive disclosure of its full scope or all of its features.

In the present disclosure, the use of ultrasound energy in human speech is used to enhance the accuracy and security of text-independent speaker verification. More specifically, the unique properties of the human speech in the human-inaudible ultrasound frequency band (i.e., frequencies greater than 20 kHz) is used. High-frequency ultrasound components in human speech present several unique properties: first, they are imperceptible by humans but can be captured by an ultrasound microphone; second, individual human speakers can produce ultrasound waves with distinct characteristics determined by the unique shape of the speech production system and the particular use (e.g., timing) of the system. Here, rather than utilizing the ultrasound signals for attack, the unique properties of the high-frequency audio spectrum are used for defense, with the goal of offering a more robust and accurate SV system.

In one aspect of the disclosure, a speaker verification system includes an ultrasonic microphone generating electrical sound signal from an audio signal corresponding to both ultrasonic frequency sound and sub-ultrasonic frequency sound. A liveness detection module generates a high frequency energy distribution based on the electrical sound signal. The liveness module generates a verification signal based on the high frequency energy distribution. A speaker verification module verifies the audio signal based on the high frequency energy distribution signals and a neural network architecture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 2A is a block diagram of a training system.

FIG. 2B is a block diagram of an enrollment system.

FIG. 2C is a block diagram of a verification system.

Corresponding reference numerals indicate corresponding parts throughout the several views of the drawings.

DETAILED DESCRIPTION

Example embodiments will now be described more fully with reference to the accompanying drawings.

In the following description, ultrasound energy in human speech is used to enhance the accuracy and security of text-independent speaker verification. More specifically, the unique properties of the human speech in the human-inaudible ultrasound frequency band (i.e., frequencies greater than 20 kHz) is used. High-frequency ultrasound components in human speech present several unique properties: first, they are imperceptible by humans but can be captured by an ultrasound microphone; second, individual human speakers can produce ultrasound waves with distinct characteristics, determined by the unique shape of the speech production system and the particular use (e.g., timing) of the system. Recent attacks towards voice assistants, such as DolphinAttack and SurfingAttack, leveraged the inaudible ultrasound signals to inject commands into voice assistants. Here, a reversed approach is used. Rather than utilizing the ultrasound signals for attack, the unique properties of the high-frequency audio spectrum is used for defense, with the goal of offering a more robust and accurate SV system.

Figure 1:
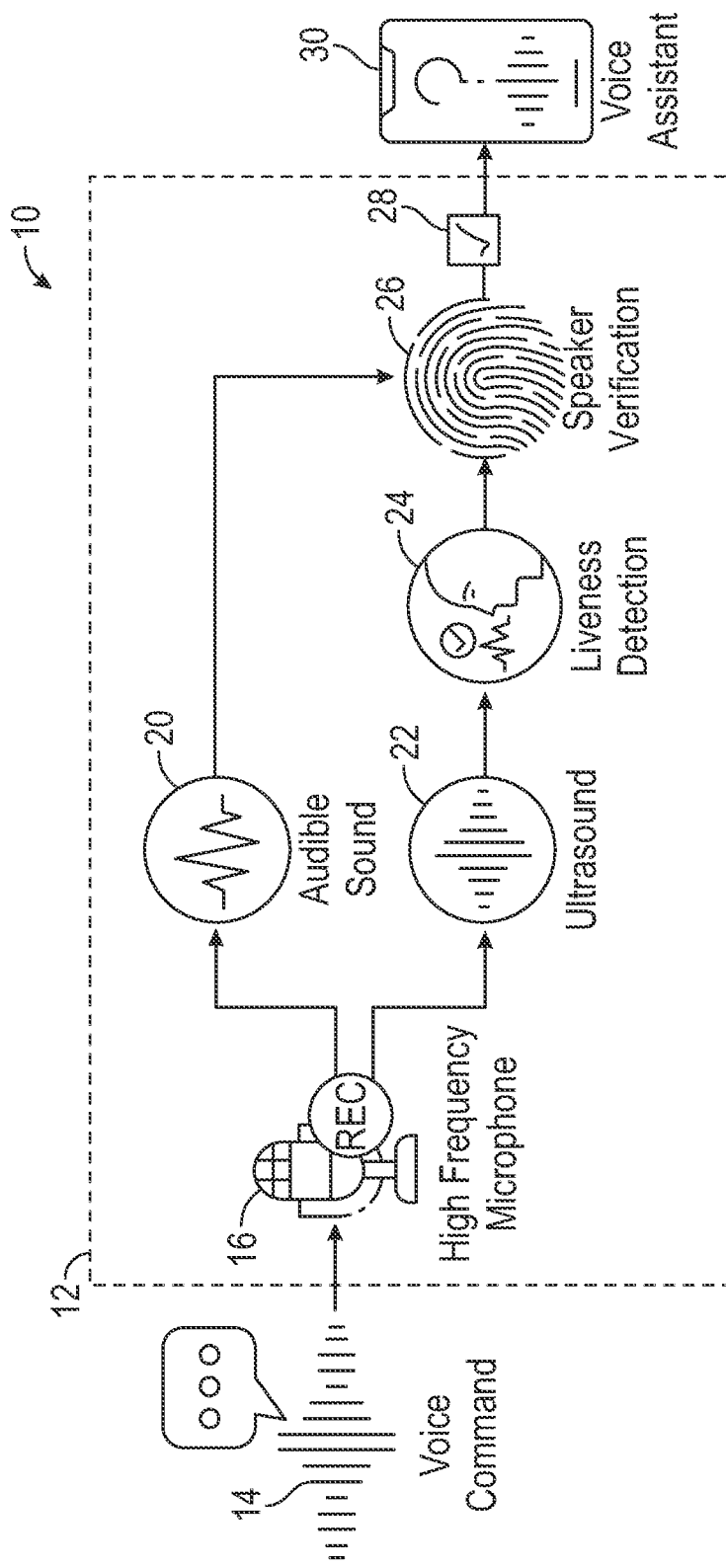
FIG. 1 is a high level block diagrammatic view of the speaker verification system.

Referring now to FIG. 1, a robust and secure text-independent speaker verification (SV) system 10 is shown in a high-level block diagram. The system may be implemented in a device 12, that may be a mobile device or a stationary device. A voice command 14 is an audible signal spoken by a person or may be an electronic device attempting to spoof (replay) a person speaking. The system 10 can distinguish spoofs from an actual speaker. The audio spectrum of the voice command includes both the audible (below 20 kHz) and ultrasound (above 20 kHz) frequency components. The present system 10 has an ultrasound microphone 16. In this example, the microphone 16 is a single microphone for receiving audible (low) frequencies and ultrasound (high) frequencies. Of course, two or more separate frequency range-specific microphones 16 may be used.

The speaker verification system 10 then processes the components of the voice to extract both a low-frequency signal which is the audible sound 20 and a high-frequency signal which is an ultrasound signal 22. The ultrasound signal is communicated to a liveness detection module 24 and a speaker verification module 26. The speaker verification module 26, in this example, uses a two-stream deep neural network (DNN) architecture, which is described in more detail below. The features determined by the neural network are ultimately fused and provided to a second level classifier such as a voice print analyzer 28 which is used to generate or match a speaker embedding for the speaker verification purpose. Ultimately the identification of a specific person is used to enable a function 30 within or associated with the device 12 such as a voice assistant, an application, disable a security feature or enable a security feature. By way of example, the system may enable the opening or unlocking of a door in a building.

With respect to the specifics of the speech, High Frequency Energy (HFE) is produced by certain phonemes (marked by dashed rectangles), such as /sh/, /s/, /sy/, and /s/ within the phrase. Phonemes with HFE exhibit less energy below 2 kHz compared with other phonemes. Phonemes with HFE may lack low-frequency energy (LFE). This phenomenon implies that the traditional LFE-based SV systems may not be able to capture sufficient characteristics of the phonemes with HFE. Everyone has a unique vocal track, which leads to a distinctive pitch, formant, and harmonic pattern on the traditional sonic voice spectrum. The modern speaker verification (SV) models follow this principle to identify voiceprint by modeling the energy distribution pattern from the Low Frequency Energy (LFE) spectrum. Therefore, by capturing the unique high-frequency characteristics in the phonemes with HFE, the ultrasound components can help boost the performance of the text-independent SV systems. Further, it was found that typical replay attacks using loudspeakers could not produce the ultrasound energy. Therefore, the ultrasound energy in human speech can be used to quickly identify loudspeaker-based spoofing attacks.

In summary, it was found that the ultrasound components in human speech reflect the speaker identity, the ultrasound features for each speaker over different speech contents are consistent, the ultrasound features for each individual speaker are consistent and the ultrasound components may help determine the liveness of the audio input.

Referring now to FIGS. 2A, 2B and 2C, by leveraging the discriminative ability of the ultrasound components in the human voice, the speaker verification system 10 is used to perform liveness detection and speaker verification simultaneously. Ultrasound features are extracted from the voice signals. Then, the ultrasound features are embedded into a two-stream DNN architecture to produce speaker embeddings via the integration of both the low-frequency and high-frequency voice components. The speaker verification system 10 is to utilize the high-frequency components of the human voice to enhance the speaker verification performance while identifying and defending against spoofing attacks. To achieve this goal, the speaker verification system 10 includes 3 main stages model training shown in FIG. 2A, speaker enrollment in FIG. 2B, and speaker verification shown in FIG. 2C.

Referring now specifically to FIG. 2A, during the model training, the speaker verification system 10 first learns how to extract effective features (speaker embedding module) from the voice data of speakers in the training pool of speakers 210. The received training voices are changed to electrical signals by the microphone 16. The electrical signals from the microphone 16 are communicated to the signal processing module 212. The signal processing module 212 preprocesses the raw signals to remove the recorded silence. Then, it extracts ultrasound features from the original audio data, and downsamples the very high-quality audio to separate and extract low-frequency features. Specifically, the silence periods within the speech are cropped to produce a clean speech signal. The original voice signal si(t) is first segmented into K frames si(t)si(t), i∈[1, K] (typically a segmentation length K is 800 samples for 16 kHz data). To crop the silence periods in si (t), a silence period counter is initialized f (si(t)) to count the number of contiguous silence periods:

$$f(s_i(t)) = \begin{cases} 0, & \text{if } \overline{(s_i(t))^2} > \theta \\ f(s_i(t))^2 + 1, & \text{if } \overline{(s_i(t))^2} \leq \theta \end{cases} \quad (1)$$

$$\theta = \min\left(\overline{(s_i(t))^2}\right) + \left(\max\overline{(s_i(t))^2}\right) - \min\left(\overline{(s_i(t))^2} * \theta_{ratio}\right).$$

If the mean square power $\overline{(s_i(t))^2}$ of the current segment si t is less than a pre-defined threshold θ, this segment is marked as a silence period, and $f(s_i(t))$ will be incremented. A constant number c is configured to indicate the toleration of contiguous silence frames. Segment si(t) will be discarded if $f(s_i(t))>c$, i.e., if all the previous c frames are regarded as silence periods. The threshold in Eq. (1) depends on the power of the current frame and a constant value $\theta_{ratio}$, which specifies the percentile of the power distribution that is considered background noise. Here, the $\theta_{ratio}$ as 0.25 is empirically set. The tolerance number c is set to 25, which means that if there are contiguous 25 frames below the threshold, the upcoming frames will be discarded until a higher power frame arrives, where the higher power frame refers to a frame with its average power exceeding θ. The selection of 0.25 and 25 is based on our empirical observations that with such threshold, the silence period is minimized while the voice signal is kept intact.

After the removal of the silence periods, the clean speech s' (t) is obtained, and then STFT converted the sound waveform into STFT spectrogram, which is a common approach adopted by the existing SV systems. Specifically, s' (t) is first segmented into time frames of 2,048 samples, and then STFT results are computed using a Hann window with ¼ window length. The amplitude spectrum is converted to dB-scale. The FFT length is set as 2,048, while the sampling rate is 192 kHz, and the frequency resolution is 192 kHz 2,048=93.75 Hz. In the end, the feature extraction produces a matrix of STFT features with the size of 1,024× L, and L can be expressed as follows:

$$L = \frac{len(s'(t)) - win_{STFT} + 1,}{hop_{STFT}} \quad (2)$$

where $win_{STFT}=2,048$, $hop_{STFT}=512$. The STFT spectrogram can be divided into different frequency ranges. The ultrasound components between 24-60 kHz are used for liveness detection, while the components across the range of 8-96 kHz are adopted for speaker verification.

Besides the high-frequency components, the low frequency components are extracted as a separate input to the SV system. To do that, a downsampling procedure using FFmpeg tool is performed to reduce the sampling rate of clean speech s'(t) from 192 to 16 kHz, and therefore obtain low frequency audio ranging in the interval kHz. The downsampled data contains the essential low-frequency components for SV. A model of the voices is generated in the signal processing module 212 that reflecting all the training form all the voice inputs.

After the signal processing module 212, a classifier may be used to generate recognition 216 of a speaker. Details on this are set forth below.

In the speaker enrollment stage of FIG. 2B, the target speakers are required to register their voices in the system. The target pool speakers 220 are input to the system in a similar manner using the signal processing module as described above. The target pool speakers 220 are the eventual users of the system that are to be authorized. For example, a mobile phone may have one authorized user, while a building security system may have tens or hundreds of authorized users. Each authorized user's unique voiceprint may be programmed into the system into the voice print analyzer 214

In FIG. 2C, the speaker verification stage is set forth. The speaker verification stage conducts the liveness detection for an unknown source 228 to ensure the audio source is spoken by a human speaker, and then verifies the speaker identity by measuring the similarity with the claimed voice print analyzer (speaker embeddings) 214.

At every stage, a signal processing module 212 converts the raw signals to fit the input shape of the model. The processed data are then fed into the liveness detection module 24 and the two-stream DNN network for speaker verification by comparing the results with the enrolled speakers, which are those speakers enrolled in the enrollment stage. The voice print analyzer 214 ultimately generates an accept or reject signal for enabling or rejecting a function of a device. For example, authorizing accessing into a mobile device or access into a building.

Figure 3:
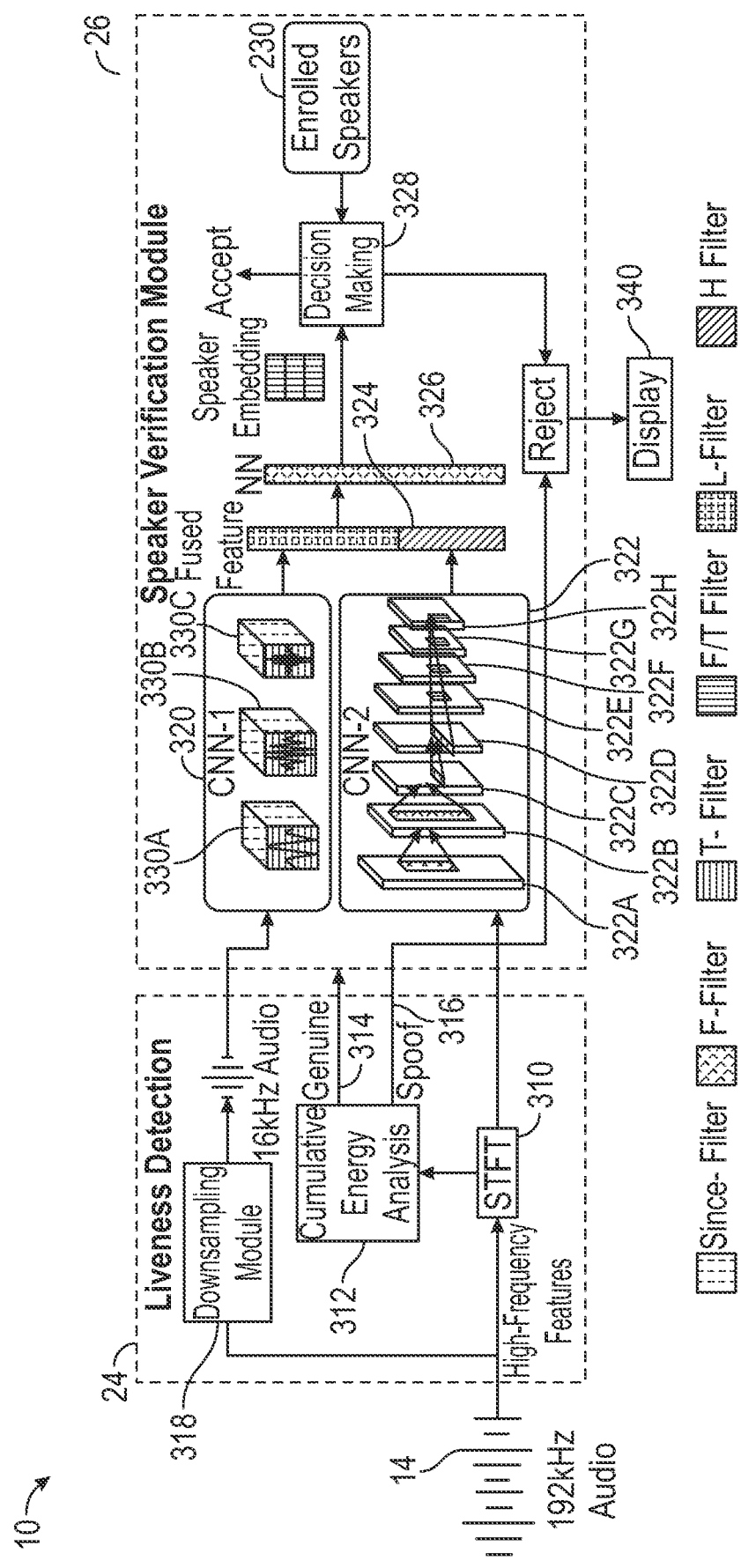
FIG. 3 is a detail block diagrammatic view of the system.
Figure 4:
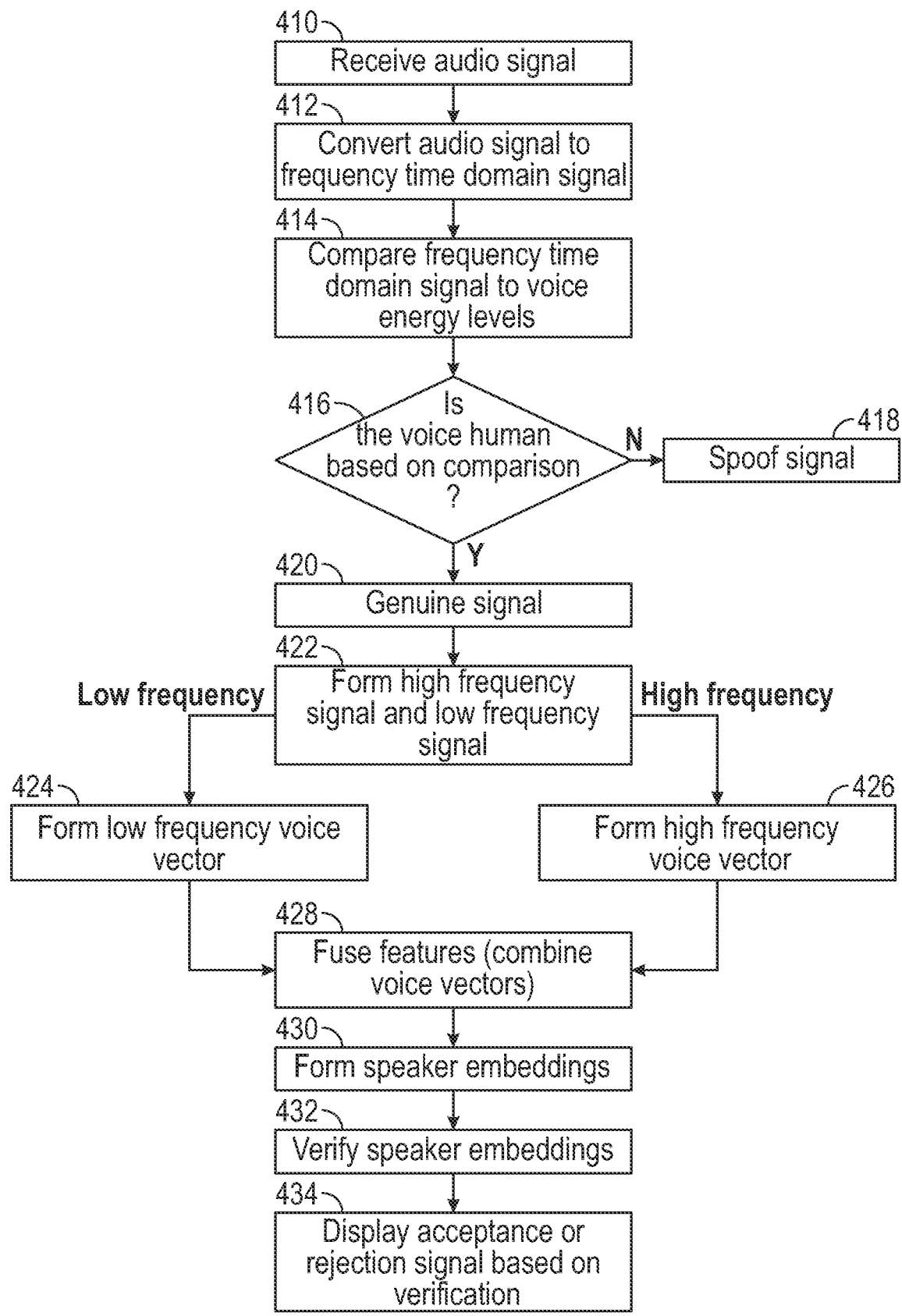
FIG. 4 is a flowchart of a high level method for operating the system.

Referring now to FIGS. 3 and 4, the liveness detection module 24 relative to the speaker verification module 26 is set forth. The liveness detection module 24 is designed to differentiate between human voice and spoofed audio. The system receives the audio (voice) signal at step 410. In step 412 the voice signal is converted to the frequency time domain signal by utilizing a short time Fourier transform (STFT) 310 and cumulative energy analysis module 312 utilizing cumulative spectral energy and analysis of captured audio frames with ultrasonic components.

In step 414 the frequency time domain signals are compared to voice energy levels. In step 416 the comparison may determine a spoof signal in step 418 or a genuine signal in step 420. The process ends if a spoof signal is determined. When a signal is genuine, speaker verification takes place as described later. The details of the energy analysis step 414 are set forth. The cumulative energy analysis module 312 generates a spoof indicator signal 314 or a genuine indicator signal 316 at steps 418 and 420 respectively. There are three attack scenarios based on different attackers' capabilities that are considered. In the first scenario, attackers record and replay with commercial devices. Since most of the traditional recording devices: do not support microphones that produce high-frequency response; do not have an analog-to-digital converter capable of producing audios with a high sampling rate; and often apply a low-pass filter behind the microphone logic to remove high-frequency components. Traditional recording devices are unable to acquire a full spectrum of human voice. An ultrasound microphone used in the present example can capture a wider spectrum of human voice, including the ultrasound components up to 48 kHz. The digital components of a loudspeaker usually have a sampling rate at or below 48 kHz. Therefore, the replayed audio does not carry any high-frequency ultrasound components as opposed to the genuine human voice. As a result, the captured ultrasound components in human voice provide a unique opportunity for developing accurate and efficient liveness detection without heavy computation.

In a second scenario, attackers record with high-end microphones and replay the recorded sounds with commercial speakers. An attacker who uses a high-end microphone (e.g., a microphone with high sampling rate, high-resolution analog-to-digital converter (ADC), and wide frequency response) to eavesdrop a victim's voice and replays the recorded voice with a commercial speaker such as smartphones or high-quality speakers. In such a scenario, the replayed audio will still carry limited HFE due to the cutoff frequency of commercial speakers. The lack of HFE constitutes a unique feature of the replay attacks.

In the third scenario, attackers record with high-end microphones and replay with ultrasound speakers. The attackers may also be equipped with high-end microphones and professional ultrasound speakers. In this scenario, although the spectrogram of the replayed audio carries HFE, the spectrogram possesses limited LFE. Therefore, the energy difference between the replayed audio and genuine human voice is easy to discern. The former has nearly zero energy below 1 kHz, while the latter presents an intact spectrum.

The cumulative spectral energy of the frames with ultrasonic components and design an accurate, efficient, and lightweight liveness detector to identify whether the audio source comes from a loudspeaker or a genuine human speaker. The detector relies on the normalized cumulative energy Sp in different frequency ranges, as defined below:

$$S_p(f) = \Sigma_{t \in M} S(f,t) - \Sigma_j \Sigma_{t \in T} S(f,t), \quad (3)$$

where S is the STFT spectrogram, t is the index of frames, T is the total number of frames, and M is the number of frames with ultrasonic components. The first term of the right-hand side summarizes the energies for all the frames with ultrasonic components, and the second term is used for normalization and noise reduction.

To defend against the attacks in Scenarios 1 and 2, $R_1$ is defined as the ratio of the ultrasonic energy over the entire spectrum as follows:

$$R_1 = \frac{\sum_{f=low_1}^{high_1} S_p(f)}{\sum_{f=0}^{high_1} S_p(f)} \quad (4)$$

The numerator is composed of the normalized accumulative energy on the high-frequency band (from $low_1$ Hz to $high_1$ Hz), while the denominator uses the energy of the entire spectrum (up to $high_1$ Hz). Here, $low_1$ and $high_1$ are set as 24 and 48 kHz, respectively. Typically, a legitimate human voice will yield a positive value of $R_1$, since its HFE is greater than the average energy of the entire spectrum. In contrast, a replay attacker with a commercial speaker will yield a negative $R_1$.

For the third scenario in which the attacker possesses a professional ultrasound microphone and high-end loudspeaker, $R_2$ is used to examine the proportion of LFE over all frequency bands as follows:

$$R_1 = \frac{\sum_{f=0}^{low_1} S_p(f)}{\sum_{f=0}^{high_2} S_p(f)} \quad (5)$$

The normalized accumulative energy below 1 kHz is supposed to be negative for replayed audio. For instance, $low_2$ is set as 1 kHz and $high_2$ as 4 kHz. By integrating $R_1$ and $R_2$, a voice input is considered as belonging to a genuine human if it satisfies the $R_1>0$ $R_2>0$ condition. Otherwise, the voice input will be classified as a replayed audio.

The liveliness detection module 24 also includes a downsampling module 318 that downsamples the low frequency voice data. In the present example, a 16 KHz audio signal is communicated to the speaker verification module 26. A time frequency time domain signals corresponding to the high frequency signal is also communicated to the speaker verification module 26.

The speaker verification module 26 begins processing the genuine human speech to verify the speaker identity. A high frequency signal and a low frequency signal are generated in step 422. A short time Fourier transform generates the high frequency signal and the downsampling module 318 generates the low frequency signal. For speaker verification, a two-stream deep neural network (DNN) model integrates ultrasound features improve the SV performance. Almost all the prior SV studies consider low-frequency audio below 8 kHz, because the typical voice characteristics such as pitch and formants only exist in low frequency range below 8 kHz. However, as observed the spectrum features above 8 kHz can indeed contribute to the speaker verification.

Typical machine learning based SV systems use the Neural Network (NN) to obtain feature embeddings. Followed by the feature embedding network, a classifier will perform the classification based on the extracted feature embeddings. In the present system the first level of networks conducts feature embedding while the second level performs the classification.

Different from the typical machine learning based SV systems, the present system contains two streams of DNN models: one performs feature embedding using the low-frequency components, and the other one embeds high-frequency features. These features will be fused together to construct one coherent feature vector which is fed into a classifier to produce a unique speaker embedding for every enrolled speaker.

The system 10 comprises three neural networks: a first convolutional neural network (CNN-1) 320, a second convolutional neural network (CNN-2) 322, and a neural network (NN) classifier 326. A fused feature module 324 receives the vectors from the neural network and combines them to form a vector representing the high frequency and low frequency features. The output of the fused feature module is communicated to the neural network classifier 326. Ultimately, a decision making module determines whether the input voice is verified or unverified in a verification signal by comparison of the neural network classifier signal to the enroller speaker signals from the enrolled speaker module 230.

Convolutional neural networks (CNNs) have been widely used in image recognition tasks, which applies convolutional computation to shrink the input size to obtain a high-level representation of high-dimensional features. The downsampled raw audio containing low-frequency components is fed into the CNN to obtain a low-frequency voice feature vector in step 424. Inspired by SincNet, three Sinc-filters are used in the present disclosure to simulate the behavior of band-pass filters, and two one-dimensional convolutional layers are used to further compress the low-frequency feature space.

The CNNs are utilized to extract low-frequency features. As the input of low-frequency feature is raw signals, the Sinc-based convolutional layer is chosen. The Sinc-based convolutional network has demonstrated high efficiency and accuracy on speaker verification and recognition tasks because it leverages interpretable filters with less network parameters. For the high frequency signal, a high frequency voice vector is formed in the CNN-1 320 in step 426. For the low frequency data stream in the present system, the Sync-based convolutional layer uses 80 filters with length L=251. The Sync layer 330A is followed by 2 standard one-dimensional convolutional layers 330B and 330C, both using 60 filters of length 5. A layer of normalization is applied for all the convolutional layers and uses the LeakyRelu function at every hidden layer to ensure the non-linearity of the CNNs model. The output dimension of the CNNs is 6420 1.

For the second data stream (high frequency), CNN-2 322 is designed to embed high-frequency voice components to form a high frequency voice vector in step 426. Since the existing CNNs, such as VGGNet, ResNet, Inception, are designed for image classification, they apply multiple convolutional layers with different shapes (mostly squared shape) of filters to capture the unique characteristics of different object shapes in the image. As opposed to the image which consists of pixels, the spectrogram data from the STFT 310 possesses both time and frequency components. Here, a CNN architecture with three complementary time-frequency convolutional filters to extract the HFE distribution and phoneme-level high-frequency representations.

This network takes high frequency cropped matrix as input and generates a high-level feature of the high-frequency components. The matrix contains 8 layers, the first two layers include 64 F-Filters 322a, 322b with size of 9×1 and dilated by 1×1 and 2×1 respectively. Three T-Filters layers 322A, 322B and 322C are set forth with size of 1×9 and dilated by 1×1 and 1×2. The next 2 layers are composed of square F/T filters 3332G and 322H, each layer has 48 filters with size of 5×5, and dilated in various scales 2×2, 4×4, 8×8 and 16×16. The 8 layers are followed by an average pooling layer that produces a feature map with 512×1 dimension.

In step 428, the high frequency voice (energy) vector and the low frequency voice (energy) vector are fused. The last NN classifier 326 is used to produce speaker embeddings in step 430 using the fused voice (energy) vector from CNNs-1 320 and CNNs-2 322. The NN classifier 326 is a fully connected layer that takes features with a dimension of 6420+512×1 and output 2048×1 dimension as the speaker embedding. Note that during the training procedure, the NN 326 also contains another fully connected layer and a softmax classifier, such that it can map 2048×1 dimension to classX1 to process the speaker recognition task, where class is the number of speakers in the training pool.

The frequency-domain filters (F-Filters) 322A and 322 extract the HFE distribution S(f) at the frequency domain. A sequence of vertical shaped filters is designed to convolve the high-frequency spectrogram. The size of F-Filter is determined by the range of frequencies involved in the convolutional computation. Based on the observation that HFE distribution can be used as the speaker voiceprint, in order to extract a finer grained energy distribution with a higher frequency resolution across the frequency range, 64 F-Filters are constructed, whose size is 9×1 with dilation 1×1 and 2×1. As a result, the filters cover the frequency range from 9 93.75=843.75 Hz to 9 2 93.75=1, 687.5 Hz.

Three time-domain filters (T-Filters) 332C-E are designed to learn the high-frequency phoneme-level representation. The T-Filter covers a time duration, which is shorter than a phoneme length to ensure that the convolution process can occur within a single phoneme. The time-domain resolution can be computed by $\text{hop}_{STFT}/192$ kHz is approximately equal to 2.7 ms. After applying the 64 1×9 T-filters that is dilated by 1×1 and 1×2, the convolution computation covers the time-domain resolution between 9×2.7=24.3 ms and 9×2.7 2=48.6 ms. Since 48 ms is shorter than typical phonemes, the time-domain frames can represent the detailed information from a single phoneme.

At the final stage of CNN-2, a sequence of square frequency-time filters (F/T-Filters 322G and 322H) with the size of 5×5 to convolve both time domain and frequency domain features concurrently. F/T-Filters 322G, 322H merge the extracted high-frequency characteristics from both the time and frequency domains, in order to yield a more representative ultrasound energy distribution for a particular speaker.

The NN classifier 326 takes the fused features that are concatenated by the output feature (energy) vectors of the CNN-1 320 and CNN-2 322 and compresses them into a desired speaker embedding dimension in step 430. Here, a fully connected layer as the NN classifier.

At the training stage, an RMSprop optimizer is used, with a learning rate lr=0.001, α=0.95, ϵ=10-7, and the default minibatch is 128.

The speaker embedding is generated by the NN classifier 326. The NN classifier 326 is essentially a fully connected layer, which maps the fused feature vector to a speaker embedding vector.

One of the challenges of the system 10 is to generate the input features from the low-frequency raw audio and high-frequency spectrum simultaneously. For this purpose, the CNN-1 320 and CNN-2 322 models require the aligned inputs of different formats (i.e., raw audio versus spectrum data). Given an incoming audio, one window is used to generate low-frequency raw audio frames, and another window to collect the windowed STFT spectrum data to be fit into the models. The window used for CNN-2 model matches the low-frequency window of the CNN model. In this example, the window size of the low-frequency data Lwin to 200 ms, corresponding to 200 ms 16 kHz=3, 200 samples, and the hop size Lhop to 10 ms with 10 ms 16 kHz=160 samples. Then, the high-frequency window size Hwin and hop size Hhop can be computed as follows:

$$H\text{win} = L\text{win} \times \alpha / \text{hop}_{STFT},$$

$$H\text{hop} = L\text{hop} \times \alpha / \text{hop}_{STFT} \qquad ,(6)$$

where $\text{hop}_{STFT}$ is the hop length of STFT spectrum (i.e., 512 in this example), and α is the ratio of high and low sampling rates. Here, the high and low sampling rates are 192 kHz and 16 kHz, respectively, i.e., α=12. $\text{hop}_{STFT}$ is used to convert the number of samples in the low-frequency components into the number of columns in the STFT matrix of the corresponding high-frequency components. This window alignment scheme guarantees that these two types of features corresponding to the same original audio input are generated at the same time. Therefore, different types of input features, including both the low-frequency voice feature and ultrasound voice feature, can be fused together to form a coherent feature vector.

When the speaker model produces the speaker embedding based on the given audio source, the decision-making module 328 in step 432 compares the cosine distance with the existing speaker embeddings, which have been generated during the enrollment stage to verify the speaker embeddings. Every sentence spoken by an authorized speaker will produce a representative speaker embedding. For example, if speaker A enrolls three sentences into the system 10, the model will generate three embeddings for A. To accept the audio as belonging to speaker A, the average cosine similarity between the tested speaker embedding and the enrolled one should be greater than a similarity threshold γ as shown below:

$$\text{decision} = \begin{cases} \text{accept}, & \text{similarity} \geq Y \\ \text{reject}, & \text{similarity} < Y \end{cases} \qquad (7)$$

Where similarity=$\Sigma_{i=0}^{N}\cos i(\text{emb}_i, \text{emb})/N$, N is number of enrolled audios for the speaker, embi is the $i^{th}$ speaker embedding, and emb is the speaker embedding to be verified. Ultimately, in step 434 a display 340 may be used to generate a display corresponding the accept signal and the reject signal generated by the decision making module 328. The display 340 may generate a rejection signal like "access denied" or an accept signal such as allowing access to a function 30 of the device 12. When access to a function is allowed the display 340 will change accordingly. For example, a new application or program screen will be displayed.

It is noteworthy that although the purpose of the NN models is to extract the speaker embedding, they operate differently in three stages. The model will learn how to extract the most representative speaker embeddings via training with a speaker recognition task. It means that the output of NN will connect to another fully-connected layer that maps the result dimension from speaker embedding to the number of classes in the speaker recognition task. For example, the model will predict a speaker label for the test utterance, and then refine the network parameters via the backpropagation of losses. In the speaker enrollment stage, however, the model simply loads the set of parameters that achieve the best results in speaker recognition task, and then extracts the speaker embeddings for the enrolled speakers.

In conclusion, human speech includes ultrasound components, and those components can help distinguish among different human speakers. Moreover, the ultrasound components in speech signals can be utilized to identify spoofing attacks by measuring the signals' cumulative energy levels at the high-frequency range.

A speaker verification and spoofing detection system has been provided. By incorporating a two-stream neural network structure with time-frequency spectrogram filters and feature fusion mechanism, the system achieves high accuracy in text-independent speaker verification.

The present system compared with other SV systems shows a 0.58% equal error rate (EER) in speaker verification, which improves the EER of the top-performing SV system by 86.1%. Remarkably, it only takes 120 ms to test an incoming utterance. Moreover, the system achieves 0% EER with 91 ms processing time for liveness detection, outperforming all existing approaches. The two-week longevity experiment demonstrates that Speaker verification system 10 is suitable for a long-term use, and its performance is barely impacted by the changes in distances and angles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   an ultrasonic microphone generating electrical sound signal from an audio signal corresponding to both ultrasonic frequency sound and sub-ultrasonic frequency sound;
   a liveness detection module generating a high frequency energy distribution based on the electrical sound signal, said liveness module generating a verification signal based on the high frequency energy distribution; and
   a speaker verification module verifying the audio signal based on the high frequency energy distribution signals and a neural network.

2. The system of claim 1 wherein the liveness module comprises a down sampling module down sampling the electrical sound signal to form low frequency components.

3. The system of claim 1 wherein the speaker verification comprises a time-frequency spectrogram filter.

4. The system of claim 1 wherein the speaker verification module comprises a first neural network generating a low frequency energy vector.

5. The system of claim 4 wherein the speaker verification module comprises a second neural network receiving and generating high frequency energy vector.

6. The system of claim 5 wherein the speaker verification module verifies the audio signal based on the high frequency energy vector and the low frequency energy vector.

7. The system of claim 1 wherein the speaker verification module comprises a two-stream neural network structure with time-frequency spectrogram filters and feature fusion mechanism.

8. A method comprising:
   generating electrical sound signal from an audio signal corresponding to both ultrasonic frequency sound and sub-ultrasonic frequency sound;
   generating a high frequency energy distribution based on the electrical sound signal by generating a verification signal based on the high frequency energy distribution; and
   verifying the audio signal based on the high frequency energy distribution signals and a neural network.

9. The method of claim 8 further comprising down sampling the electrical sound signal to form low frequency components.

10. The method of claim 8 wherein verifying the audio signal comprises verifying the audio signal with a time-frequency spectrogram filter.

11. The method of claim 8 wherein verifying the audio signal comprises verifying the audio signal using a first neural network generating a low frequency energy vector.

12. The method of claim 11 wherein verifying the audio signal comprises verifying the audio signal using a second neural network receiving and generating high frequency energy vector.

13. The method of claim 12 wherein verifying the audio signal comprises verifying the audio signal based on the high frequency energy vector and the low frequency energy vector.

14. The method of claim 8 wherein verifying the audio signal comprises verifying the audio signal using a two-stream neural network structure with time-frequency spectrogram filters and feature fusion mechanism.

15. A method comprising:
   receiving an audio signal;
   differentiating between a human voice and a spoofed voice;
   when the audio signal is a human voice, performing the steps of,
   forming a high frequency signal from the audio signal;
   forming a high frequency voice vector from the high frequency signal;
   forming a low frequency signal from the audio signal;
   forming a low frequency voice vector from the low frequency voice signal;
   fusing the low frequency voice vector and the high frequency voice vector to form a fused vector;
   forming speaker embeddings from the fused vector;
   verifying the speaker embeddings; and
   displaying an acceptance signal or a rejection signal based on verifying.

16. The method of claim 15 wherein differentiating between the human voice and a spoofed voice comprises converting the audio signal to a frequency time domain signal, and comparing the frequency time domain signals to a voice energy level.

17. The method of claim 15 wherein forming the high frequency signal comprises forming the high frequency signal with a short time Fourier transform.

18. The method of claim 15 wherein forming the low frequency signal comprises forming the low frequency signal by downsampling.

19. The method of claim 15 Wherein forming the high frequency voice vector comprises forming the high frequency voice vector in a first neural network.

20. The method of claim 19 wherein forming the low frequency voice vector comprises forming the low frequency voice vector in a second neural network.

21. The method of claim 15 wherein verifying the speaker embeddings comprises verifying the speaker embeddings by comparing the speaker embeddings with existing speaker embeddings.

22. The method of claim 21 wherein comparing the speaker embeddings is performed by comparing a cosine similarity with the existing speaker embeddings.

23. The method of claim 21 wherein comparing the speaker embeddings is performed by determining an average cosine similarity with existing speaker embeddings and determining the average cosine similarity between the speaker embedding and an existing speaker embedding is greater than a similarity threshold.

* * * * *